(12) United States Patent
Lenseigne et al.

(10) Patent No.: US 9,412,171 B2
(45) Date of Patent: Aug. 9, 2016

(54) ADAPTIVE MULTI-DIMENSIONAL DATA DECOMPOSITION

(71) Applicant: Technische Universiteit Delft

(72) Inventors: Boris Arnold Jean Lenseigne, Delft (NL); Eelko Christiaan Cornelis Van Breda, Delft (NL); Petrus Paulus Jonker, Delft (NL)

(73) Assignee: QDEPQ SYSTEMS B.V., Delft (NL)

( * ) Notice: Subject to any disclaimer, the term of this patent is extended or adjusted under 35 U.S.C. 154(b) by 84 days.

(21) Appl. No.: 14/374,064

(22) PCT Filed: Jan. 23, 2013

(86) PCT No.: PCT/EP2013/051255
§ 371 (c)(1),
(2) Date: Jul. 23, 2014

(87) PCT Pub. No.: WO2013/110668
PCT Pub. Date: Aug. 1, 2013

(65) Prior Publication Data
US 2015/0030234 A1    Jan. 29, 2015

(30) Foreign Application Priority Data

Jan. 25, 2012   (GB) .................................. 1201230.8

(51) Int. Cl.
*G06T 7/00* (2006.01)

(52) U.S. Cl.
CPC ........... *G06T 7/0053* (2013.01); *G06T 2200/04* (2013.01); *G06T 2207/20012* (2013.01); *G06T 2207/20016* (2013.01)

(58) Field of Classification Search
CPC ........... G06K 2209/09; G06T 2200/04; G06T 2207/10016; G06T 2207/10024; G06T 2207/10028

See application file for complete search history.

(56) References Cited

U.S. PATENT DOCUMENTS 5,983,162 A    11/1999  Huang
6,943,724 B1 *  9/2005  Brace .................. G01S 13/9029
                                          342/175

(Continued)

FOREIGN PATENT DOCUMENTS

KR          100806201 B       2/2008
WO       WO2011097306    *    6/2011
WO        2011/097306 A1      8/2011

OTHER PUBLICATIONS

J.C. Nunes et al. "Image Analysis by Bidimensional Empirical Mode Decomposition" Image and Vision Computing, vol. 21, No. 12, Nov. 2003, pp. 1019-1026.

(Continued)

*Primary Examiner* — Stephen R Koziol
*Assistant Examiner* — Shaghayegh Azima
(74) *Attorney, Agent, or Firm* — Wood, Phillips, Katz, Clark & Mortimer

(57) ABSTRACT

A method of decomposing an image or video into a plurality of components. The method comprises: obtaining (10) an intensity signal of the image or video; and decomposing (30) the intensity signal into a component representing the three-dimensional structure shape of one or more objects in the scene and at least one other component. Also provided is a method of performing an Empirical Mode Decomposition on data in two or more dimensions, using normalized convolution.

12 Claims, 6 Drawing Sheets

(56) References Cited

U.S. PATENT DOCUMENTS

| | | | | |
|---|---|---|---|---|
| 2004/0013305 | A1* | 1/2004 | Brandt | G06F 17/30902 382/224 |
| 2007/0269115 | A1* | 11/2007 | Wang | H04N 19/124 382/232 |
| 2009/0252411 | A1* | 10/2009 | Siddiqui | G06T 3/4007 382/167 |
| 2010/0074496 | A1 | 3/2010 | Pao et al. | |
| 2010/0080448 | A1* | 4/2010 | Tam | G06T 7/0051 382/154 |
| 2011/0069139 | A1* | 3/2011 | Liu | H04N 7/147 348/14.07 |
| 2012/0081517 | A1* | 4/2012 | Komaki | H04N 13/0296 348/46 |
| 2012/0314027 | A1* | 12/2012 | Tian | H04N 7/181 348/43 |
| 2013/0019024 | A1* | 1/2013 | Sheth | H04N 21/2381 709/231 |
| 2013/0058562 | A1* | 3/2013 | Chen | G06K 9/00201 382/154 |
| 2013/0311083 | A1* | 11/2013 | Mikami | G01C 21/3697 701/428 |
| 2014/0050417 | A1* | 2/2014 | Jiang | G06K 9/40 382/261 |
| 2014/0086346 | A1* | 3/2014 | Mottaiyan | H04B 3/30 375/257 |
| 2014/0320602 | A1* | 10/2014 | Govindarao | H04N 9/045 348/46 |
| 2015/0302562 | A1* | 10/2015 | Zhai | H04N 19/46 382/233 |

OTHER PUBLICATIONS

Jorge Lopez-Moreno et al. "Non Photorealistic, Depth-Based Image Editing" Computers and Graphics, vol. 35, No. 1, Nov. 2010, pp. 99-111.
J.C. Nunes et al. "Texture Analysis Based on Local Analysis of the Bidimensional Emprirical Mode Decomposition" Machine Vision and Applications, vol. 16, No. 3, May 2005, pp. 177-188.
Somayeh Bakhtiari et al. "An Enhanced Empirical Model Decomposition Based Method for Image Enhancement" Systems, Man, and Cybernetics, Oct. 2011, pp. 2681-2686.
Sharif M. A. Bhuiyan et al. "Edge Detection Via a Fast and Adaptive Bidimensional Empirical Mode Decomposition" Machine Learning for Signal Processing, Oct. 2008, pp. 199-204.
Maja Rudinac et al. "Empirical Mode Decomposition for Saliency Detection" Proceedings of the Fourteenth International Conference on Genetic and Evolutionary Computation Conference Companion, Jul. 2012, p. 365.
J.D. Durou et al. "Numerical Methods for shape From Shading: A New Survey With Benchmarks" Computer Vision and Image Understanding, 2008, pp. 22-43.
B.D Gupta Increment Threshold as a Function of Background Illumination: Contribution of Cellular Adaptation KOB Series, vol. 11,1991, pp. 81-85.
James Kajiya "The Rendering Equation" SIGGRAPH Comput. Graph, vol. 20, No. 4, 1986.
Erum Kahn "Image Based Material Editing" ACM Trans. Graph, 2006.
Pentland "Shape Information From Shading: A Theory About Human Perception" Second International Conference on Computer Vision, 1988, pp. 404-413.
R. Zhang et al. "Shape From Shading: a survey" IEEE Transactions on Pattern Analysis and Machine Intelligence, 1999, pp. 690-706.
R. Bhagavatula et al. "Analyzing Facial Images Using Empirical Mode Decomposition for Illumination Artifact Removal and Improved Face Recognition" Acoustics, Speech, and Signal Processing, 2007, pp. I505-I508.
S.M.A. Bhuiyan et al. "Fast and Adaptive Bidimensional Empirical Mode Decomposition Using Order Statistics Filter Based Envelope Estimation" EURASIP Journal on Advances in Signal Processing, 2008.
Damerval et al. "A Fast Algorithm for Bidimensional EMD" IEEE Signal Processing Letters, 2005.
F. De Jong et al. "Gradient Estimation in Uncertain Data" Machine and Vision Applications, 1998, pp. 144-147.
P. Flandrin et al. "EMD Equivalent as Data Driven Wavelet-Like Expansions" International Journal of Wavelets, Multiresolution and Information Processing, 2004, vol. 2, No. 4.
P. Flandrin et al. "EMD Equivalent Filter Banks, From Interpretation to Application" The Hilbert-Huang Transform and it's Applications, 2005, pp. 55-74.
Huang et al. "The Empirical Mode Decomposition and the Hilbert spectrum for Nonlinear and Non-Stationary Time Series Analysis" Proceedings of the Royal Society of London, Series A; Mathematical, Physical, and Engineering Sciences Mar. 1998, pp. 903-995.
H. Knutsson et al. "Normalized and Differential Convolution: Methods for Interpolation and Filtering of Incomplete and Uncertain Data" Computer and Vision Patters Recognition, Jun. 1993, pp. 515-523.
Linderhed "Image Compression Based on Empirical Mode Decomposition" International Conference on Image and Graphics, 2004, pp. 430-433.
Linderhed "Compression by Image Empirical Mode Decomposition" IEEE International Conference, 2005, vol. 1, pp. I553-I556.
Z. Liu et al. "Boundary Processing of Bidimensional EMD Using Texture Synthesis" IEEE Signal Processing Letters, 2005, pp. 33-36.
D. Looney et al. "Multiscale Image Fusion Using Complex Extensions of EMD" IEEE Transactions, 2009, pp. 1626-1630.
J.C. Nunes et al. "Image Analysis by Bidimensional Empirical Mode Decomposition" Image and Vision Computing, vol. 21, 2003, pp. 1019-1026.
A. Ogier et al. "Biased Image Correction Based on Empirical Mode Decomposition" International Conference on computer Vision, 2007, pp. I: 533-536.
M.C. Peel et al. "Assessing the performance of rational spline-based empirical mode decomposition using a global annual precipitation dataset" Proceedings of the Royal Society: Mathematical, Physical, and Engineering Science, 2009, pp. 1919-1937.
T.Q. Pham et al. "Robust fusion of Irregularly Sampled Data Using Adaptive Normalized Convolution" ERASIP Journal on Applied Signal Processing, 2006.
S. Sinclair et al. "Empirical Mode Decomposition in 2-D space and time: a tool for space-time rainfall analysis and nowcasting" Hydrology and Earth System Sciences, 2005, pp. 127-137.
L. Vincent "Morphological grayscale reconstruction in image analysis: Applications and Efficient Algorithms" IEEE Transactions on Image Processing, 1993, pp. 176-201.
Washizawa et al. "A flexible method for envelope estimation in empirical mode decomposition" KES vol. 4253 of Lecture Notes in Computer Science, 2006, pp. 1248-1255.
Y. Xu et al. "Two Dimensional empirical mode decomposition by finite elements" Proceedings of the Royal Society: Mathematical, Physical and Engineering Science, 2006, pp. 3081-3096.
Hamilton et al. "The Luminance-response function of the human photopic electroretinogram: a mathematical model" Vision RES., 2007.
Geisler "Mechanisms of visyual sensitivity: backgrounds and early dark adaptation" Vision RES., 1983.
Rilling et al. "On empirical mode decomposition and its algorithms" IEEEE-EURASIP Workshop on nonlinear signal image processing, vol. 3, 2003.
Bhuiyan et al. "Study of Bidimensional Empirical Mode Decomposition Method for Various Radial Basis Function Surface Interpolators" Machine Learning and Applications, 2009, pp. 18-24.
Anna Linderhed "Image Empirical Mode Decomposition: A New Tool for Image Processing" Advances in Adaptive Data Analysis, vol. 1, No. 2, 2009, pp. 265-294.
Office Action re Application Serial No. GB1201230.8 received May 21, 2012.
International Search Report for corresponding PCT application No. PCT/EP2013/051255.

\* cited by examiner

ADAPTIVE MULTI-DIMENSIONAL DATA DECOMPOSITION

This invention relates to methods and an apparatus for adaptive, multi-scale decomposition of multi-dimensional data. More particularly, it relates to the use of a multi-scale decomposition to extract a plurality of components from an image (or a sequence of images). In another aspect, the invention relates to an Empirical Mode Decomposition. This adaptive, multi-scale decomposition can be used to extract components from images, as mentioned, but it can also be used more generally for data analysis.

Three-dimensional (3D) images and videos are of increasing importance in broadcast and video imaging. Existing technologies for generating 3D pictures, either involve using several (at least two) cameras—which drastically increases production costs—or using special illumination and sensing techniques, such as structured light or Time of Flight (ToF). The latter range-finding techniques are not well suited for use in broadcast and video imaging, because natural illumination is normally required for aesthetic reasons.

Shape-From-Shading (SFS) techniques have been proposed in the literature for extracting depth information from still images. Some examples of such a technique are given by Durou, Jean-Denis; Falcone, Mauricio. & Sagona, Manuela, "Numerical methods for shape-from-shading: A new survey with benchmarks", Computer Vision and Image Understanding, 2008, 109, 22-43.

The present inventors have recognised that it would be desirable to be able to generate 3D pictures from single-view 2D pictures. Existing shape-from-shading techniques do not fully address this need. Therefore, the inventors have identified a need for an improved way of deriving three-dimensional structural information from 2D images. This structural information includes the shapes and relative positions or poses of objects in the scene.

According to an aspect of the invention, there is provided a method of decomposing an image or video into a plurality of components, the method comprising:

obtaining an intensity signal of the image or video; and decomposing the intensity signal into a component representing the three-dimensional structure of one or more objects in the scene and at least one other component, wherein the intensity signal is decomposed according to the spatial scale of variations in the intensity, and the other component comprises at least one of:

a component representing surface reflectance of the objects;

a component representing noise in the image; and a component representing illumination in the scene, the noise and reflectance components comprising variations at a small scale, the structure component comprising variations at a medium scale, and the illumination component comprising variations at a large scale or a uniform value.

The intensity signal is preferably decomposed into at least three components: a component representing noise and/or surface reflectance (also referred to herein as a "texture" component); the component representing shape (and other 3D structure); and a component representing illumination.

In natural images, an intensity signal contains features caused by the shape of objects in the scene; features caused by variations in the surface reflectance of the objects (surface texture); and features caused by illumination or variation in illumination. The present inventors have recognised that—for many typical natural images—these features can be substantially separated into different component images, by considering the spatial scales over which the different types of features occur. In particular, they have recognised that, within a given image, texture features generally exhibit a smaller (finer) scale intensity variation, illumination features exhibit a larger scale variation, and features arising from 3D structure exhibit an intermediate scale, between the larger and smaller scales. Furthermore, the inventors have recognised that the components can be effectively separated by multi-scale (or multi-resolution) analysis.

Any noise in the intensity signal tends to be collected mainly at the finest scale, so that the texture component also includes a noise component. The illumination component may comprise a non-stationary component of the intensity signal (that is, one whose statistical properties vary between different regions of the image).

The intensity signal is a single-valued function derived from the image. For example, if the image or video is input in a colour format, such as RGB, the intensity signal may be a luminance signal extracted from the RGB values. However, the scope of "intensity" is not limited to luminance.

The decomposition may comprise non-linearly filtering the intensity signal.

A nonlinear filter is a signal-processing operation whose output is not a linear function of the input.

The basis functions of the decomposition may be determined adaptively from the intensity signal.

This means that the decomposition does not use a fixed set of basis functions, such as a wavelet or Fourier basis. Instead, the basis functions are extracted from or adapted to the intensity data. This helps the method to produce consistent results for very different types of image, in particular, because it facilitates an unsupervised and relative (rather than absolute) definition of the scales of each of the different components.

The decomposition preferably comprises a two-dimensional Empirical Mode Decomposition, EMD.

The EMD comprises decomposing the intensity signal into a plurality of Intrinsic Mode Functions. An Intrinsic Mode Function (IMF) is a function that preferably satisfies two conditions: (1) in the whole data set, the number of extrema and the number of zero crossings must either be equal or differ at most by one; and (2) at any point, the mean value of the envelope defined by the local maxima and the envelope defined by the local minima is zero.

The EMD process typically comprises: (i) determining a local spatial average of the input signal at each point in the image; (ii) calculating a difference signal between the input signal and its local average; (iii) preferably iterating steps (i) and (ii) a predetermined number of times or until convergence, using the difference signal calculated in the previous iteration as the input signal to the next iteration; (iv) identifying the difference signal calculated in (the final iteration of) step (ii) as an IMF; (v) calculating a remainder signal as the difference between the IMF and the input signal; (vi) preferably iterating steps (i) to (v) a predetermined number of times or until convergence, using the remainder signal from the previous iteration as the input signal to the next iteration; and (vii) identifying the remainder signal (from the final iteration) as a residue function of the decomposition.

Preferably at least two IMFs are generated (in addition to a residue). The components of the image are preferably derived from the EMD as follows. The first IMF (at the finest/smallest scale) is identified as the texture and/or noise component. The final residue function is identified as the illumination component; this will be the coarsest/largest scale of the decomposition. The structure component is derived by combining the other IMFs (that is, those at intermediate scales).

The EMD advantageously comprises: determining a local average of the intensity signal at each point in the image, wherein the local average at each point in the image is defined as the mean of two envelope functions at that point: a maximum envelope, comprising a function which interpolates among local maxima of the intensity signal; and a minimum envelope, comprising a function which interpolates among local minima of the intensity signal, the method further comprising generating the maximum envelope by: extracting from the intensity signal a sparse maximum intensity signal which comprises the value of the intensity signal at local maxima; and performing normalized convolution of the sparse maximum intensity signal with a smoothing filter; and generating the minimum envelope by: extracting from the intensity signal a sparse minimum intensity signal which comprises the value of the intensity signal at local minima; and performing normalized convolution of the sparse minimum intensity signal with a smoothing filter.

The use of normalised convolution to generate each envelope (and thereby the local average) results in a decomposition with particularly advantageous properties. The advantages will be discussed in general terms later, below. When the EMD is being used to extract structure, texture and illumination components, as summarised above, the general advantages translate to stable, robust, and predictable results across different types of image. In particular, the properties of each component for one arbitrary image will match the properties of each corresponding component for another arbitrary image. This helps to provide a reliable unsupervised method for extracting the desired components.

The method may further comprise generating a depth map from the structure component. In particular, the depth map may be generated according to equation (3), to be described subsequently herein.

Apart from generating a depth map, the methods summarised above may also be exploited for other image and video processing tasks. These may include—for example— editing, special effects, and image enhancement. These methods may use any of the components mentioned, in isolation or in any combination.

The at least one other component resulting from the decomposition preferably comprises an illumination component; and the generated depth map is preferably constructed dependent upon the illumination component.

The dependence of the depth map upon the illumination component may comprise modulating the depth map in inverse relation to the illumination. In particular, the depth map may be generated according to equation (5), to be described subsequently herein.

The method may further comprise using the generated depth map to synthesise image data suitable for 3D display.

The image data is suitable for creating a 3D image using a 3D display. For example, the 3D image data may comprise the depth map combined with a 2D image. Alternatively, it may comprise a left-right pair of stereo images. In either case the 3D image data is preferably generated by combining the depth map with the original 2D image data (or with a processed version of the original 2D image data). The 3D image data may be provided in compressed or uncompressed form. It may be encoded, for example for robust transmission or storage or, alternatively, it may be provided without encoding.

Also provided, according to an aspect of the invention, is a signal representing 3D image data synthesised using the method summarised above. The signal is preferably stored on a machine-readable storage medium.

Preferably, the image is a high dynamic range image.

Here, the dynamic range is defined as the number of discrete levels that can be represented between the highest intensity value and the lowest intensity value a given the image format. "Low" dynamic range is typically used to designate images less than or equal to 256 levels. This corresponds to the 8-bit values traditionally captured by many digital cameras. In the case of colour images, Low dynamic Range (LDR) includes images with 8 bits per channel—that is, 24-bit colour. High Dynamic Range (HDR) means intensity images with greater than 256 levels, preferably 512 levels or higher. With a greater number of discrete levels, quantization noise (the error between the actual amount of light falling on the sensor and the quantized digital level representing that light) is reduced. It has been found that HDR images are especially beneficial when used in conjunction with the present invention. It is thought that the more accurate representation of the scene allows some of the assumptions of traditional shape-from-shading approaches to be relaxed.

According to a further aspect of the invention, there is provided a method of performing an Empirical Mode Decomposition on image or video data in two or more dimensions, the image or video data comprising an array of image elements each having at least one value, the method comprising:

determining a local spatial average value for each element, wherein the local average at each element is defined as the mean of two envelope functions at that element:

a maximum envelope, comprising a function which interpolates among local maxima of the element values; and a minimum envelope, comprising a function which interpolates among local minima of the element values, the method further comprising generating the maximum envelope by:

extracting from the element values a sparse maximum signal which comprises the value of the element at each local maximum; and performing normalized convolution of the sparse maximum signal with a smoothing filter; and generating the minimum envelope by:

extracting from the element values a sparse minimum signal which comprises the value of the element at each at local minimum; and performing normalized convolution of the sparse minimum signal with a smoothing filter.

The use of normalised convolution to generate each envelope (and thereby the local average) results in a decomposition with particularly advantageous properties. In this context, therefore, normalised convolution has special benefits over other possible interpolation methods. It can produce smooth envelopes; it avoids using basis functions which could introduce spurious features or artificial properties into the decomposition; it is able to follow the data, in the sense that the local extrema of the data are the only local extrema in the envelope; boundary conditions (at the borders of the image) are handled correctly without data extrapolation or any assumption of periodicity; and—perhaps most importantly, for practical implementation—the computational complexity increases only linearly with the number of local extrema. This last advantage facilitates a scalable implementation in real-time environments.

In more detail the EMD process preferably comprises (i) determining at each element a local spatial average of the input values; (ii) calculating a difference signal between the input element values and the corresponding local average values; (iii) preferably iterating steps (i) and (ii) a predetermined number of times or until convergence, using the difference signal calculated in the previous iteration as the input to the next iteration; (iv) identifying the difference signal calculated in (the final iteration of) step (ii) as an IMF; (v) calculating a remainder signal as the difference between the IMF and the input; (vi) preferably iterating steps (i) to (v) a predetermined number of times or until convergence, using the remainder signal from the previous iteration as the input to the next iteration; and (vii) identifying the remainder signal (from the final iteration) as a residue function of the decomposition.

Convergence in step (iii) may be detected by comparing the difference signals generated in successive iterations. When the change between iterations is below a predefined threshold, convergence is declared. The change can be quantified by the standard deviation between the difference signals of each iteration.

Convergence in step (vi) may be detected by the absence of any further local minima or maxima in the remainder signal.

When considering an image, or when considering a video as a stream of individual images, the "image elements" of the array are pixels. When the method is applied to a video, the frames can be treated as separate images and processed independently. Alternatively, multiple frames can be processed jointly. In some embodiments, the image elements may be voxels.

The normalised convolution may be calculated by combining the results of two convolution operations—more particularly, as a ratio between the results of two convolution operations.

The first convolution is between the smoothing filter function and the sparse signal consisting of the local extrema (maxima or minima, respectively) of the pixel values. The second convolution is between the filter function and a certainty map. The certainty map is equal to 1 where the sparse signal is non-zero and is (explicitly or implicitly) equal to 0 elsewhere. That is, the certainty map is a binary map marking the positions of the extrema in the sparse signal. Accordingly, the second convolution can preferably be implemented as a summation of values of the filter function corresponding to the non-zero entries in the certainty map.

The smoothing filter function for the normalised convolution may be a Gaussian Radial Basis Function (RBF).

A spatial scale parameter of the smoothing filter may be chosen dependent upon a representative distance between neighbouring points in the set of maxima, or in the set of minima, or in the union of both sets.

The representative distance may be an average distance between neighbouring extrema. "Neighbouring" points may be determined, for example, by the connections between vertices in the Delaunay triangulation of the point-set in the Cartesian plane. When the filter is a Gaussian RBF, the scale parameter is the standard deviation ("sigma") of the function. Sigma is preferably set equal to the mean distance between neighbouring extrema.

Note that when the EMD technique is applied to an intensity image/signal (as summarised previously above) the "pixel value" at each pixel is simply the value of the intensity signal at that pixel.

A local maximum can be defined as a pixel whose value is greater than the values of the other 8 pixels surrounding it, in a 3×3 square neighbourhood centred on the pixel; and a local minimum can be defined as a pixel whose value is less than the values of those other 8 pixels.

This definition has been found to be particularly beneficial for the EMD. It avoids the detection of flat plateaus as local maxima (respectively minima). This has been found to be desirable because these plateaus comprise features which should be sifted into an IMF at a larger scale. This helps to avoid mode-mixing. The restrictive definition of the neighbourhood also avoids introducing any bias related to the scale of the significant features to be considered at each level of the decomposition.

Also provided is a computer program comprising computer program code means adapted to control a physical computing device to perform all the steps of any of the methods summarised above when said program is executed on the physical computing device. Also provided is such a computer program embodied on a computer-readable medium.

According to another aspect of the invention, there is provided signal processing apparatus adapted to perform an Empirical Mode Decomposition on numerical data, the data comprising an array of elements in two or more dimensions, each element comprising a value, the apparatus comprising:
an averaging unit, adapted to determine for each element in the array a local average value,
wherein the local average at each element is defined as the mean of two envelope functions at that element:
a maximum envelope, comprising a function which interpolates among local maxima of the element values; and
a minimum envelope, comprising a function which interpolates among local minima of the element values,
the averaging unit further comprising:
a local extrema extraction unit, adapted to extract from the element values a sparse maximum signal which comprises the element-value at each local maximum and a sparse minimum signal which comprises the element-value at each at local minimum;
a maximum envelope generation unit, adapted to generate the maximum envelope by performing normalized convolution of the sparse maximum signal with a smoothing filter; and
a minimum envelope generation unit, adapted generate the minimum envelope by performing normalized convolution of the sparse minimum signal with a smoothing filter.

This apparatus may be adapted to perform a method as summarised previously above, wherein the data is image or video data and the array of elements comprises an array of pixels.

Each envelope generation unit preferably comprises: a plurality of worker units, each unit adapted to calculate the contribution of one local extremum to the normalized convolution for a plurality of elements in the array; and an adder, for summing the contributions of the workers for each element of the plurality.

The worker unit may calculate the contribution of one local extremum to all elements of the array. However, some of the contributions for array-elements far from the local extremum may be zero (depending upon the filter chosen) and therefore these calculations will not need to be performed.

Each worker unit is preferably adapted to calculate and output for each of the plurality of elements: a value of the smoothing filter function for the element; and a product between the value of the smoothing filter function and the value of the local extremum.

These two items make up the contribution of the local extremum to the denominator and numerator convolution operations, respectively, for each element.

Also provided is an image or video processing circuit adapted to perform a method according to claim 8, comprising and using the apparatus of claim 14 or claim 15.

Also provided is a camera or display device (such as a television) comprising this image or video processing circuit. The apparatus summarised above is particularly well suited for use in a camera (such as a digital video camera) or display, because the operations are designed to be implemented efficiently in real-time—for example, in a pipelined or parallel implementation. This can allow a video camera with a single 2D image sensor to synthesise and output a live 3D video signal. Similarly, a television or other display means can receive a video stream consisting of 2D pictures and can augment these pictures in real-time to produce and display 3D pictures.

According to still another aspect of the invention, there is provided apparatus for decomposing an image or video into a plurality of components, the apparatus comprising:

a luminance extraction unit for obtaining an intensity signal of the image or video; and a signal decomposition unit for decomposing the intensity signal into a component representing the three-dimensional structure of one or more objects in the scene and at least one other component, wherein the intensity signal is decomposed according to the spatial scale of variations in the intensity, and the other component comprises at least one of:
a component representing surface reflectance of the objects;
a component representing noise in the image; and
a component representing illumination in the scene, the noise and reflectance components comprising variations at a small scale, the structure component comprising variations at a medium scale, and the illumination component comprising variations at a large scale or a uniform value.

The apparatus may further comprise a depth recovery unit for generating a depth map from the structure component The invention will now be described by way of example with reference to the accompanying drawings, in which.

An example of a 2D to 3D conversion process will now be described, using a depth-recovery method according to an embodiment of the invention.

Figure 1:
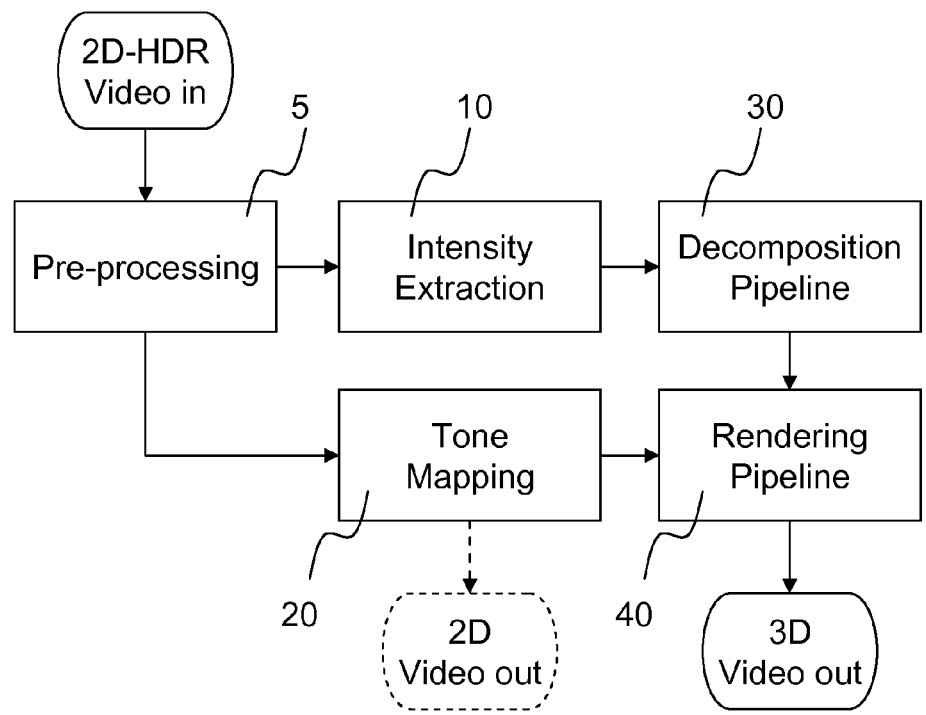
FIG. 1 illustrates a system-architecture for 2D to 3D conversion, according to an embodiment of the invention.

An overview of the system architecture is shown in FIG. 1. The input receives High Dynamic-Range (HDR) image data. Pre-processing of the image data is performed by a pre-processing block 5. The output of this is connected to a luminance extraction block 10 and a tone mapping block 20. The output of the luminance extraction block 10 is input to a signal decomposition pipeline 30: This element performs signal decomposition steps in order to extract structural data from the luminance signal. The tone mapping block 20 converts the HDR image data into conventional Low Dynamic Range (LDR) data for standard display purposes. This block also acts as a buffer where original data can be stored while the depth is calculated. The output of the tone mapping block 20 and the output of the signal decomposition block 30 are connected to the input of a rendering block 40. The rendering pipeline 40 performs the depth calculation from the structural data provided by the signal decomposition block and merges the result with the original (tone mapped) data to produce images. Synchronisation circuitry (not shown) is provided to coordinate the activities of the different blocks. This includes buffer and memory management features as well as synchronisation mechanism to allow real-time processing in high resolution at a high frame rate. Those skilled in the art will be able to implement suitable synchronisation mechanisms, based on the common general knowledge.

The input to the system is a HDR image data stream. The input image data can be represented in the form of multiple-exposure LDR images, with associated exposure parameters. Alternatively, it can be encoded using a specific, non-linear, sensor response. In the case of multiple exposures, the images are merged together using the exposure information, to produce a single HDR intensity image. In the case of a non linear sensor, a specific sensor response function is used to build HDR data. In all cases, the output of the pre-processing stage 5 is preferably an image data stream with linear dynamics and a high dynamic range.

The signal is then sent to an intensity extraction stage 10 where the HDR colour image signal is converted to a gray-scale luminance signal corresponding to the radiance of the scene. Simultaneously, the HDR colour data is sent to the tone mapping pipeline 20. The extracted luminance signal is next forwarded to the signal decomposition stage 30.

In this example, depth will be extracted from a luminance signal. However, it should be understood that other transformations from colour signals to a single-valued intensity signal are also possible. The present invention is not limited to luminance signals as defined in the following example. Any other suitable conversion may be applied instead.

Luminance is a perceptual quantity that describes how much light is perceived by a sensor. In the world of digital imaging, luminance is a normalised value calculated as the weighted sum of the colour components of each pixel (x, y):

$$L(x,y)=0.2116R(x,y)+0.7152G(x,y)+0.0722B(x,y) \quad (1)$$

This transformation is performed by the intensity extraction stage 10.

Figure 2:
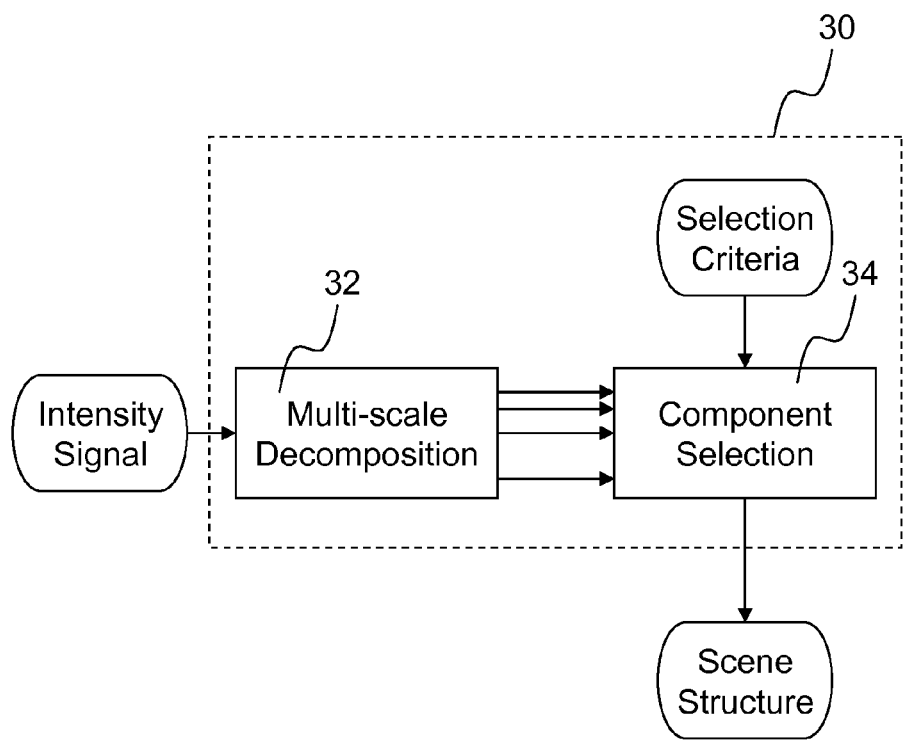
FIG. 2 is a block diagram of the decomposition pipeline of FIG. 1.

The signal decomposition 30 is the core of the system. As shown in FIG. 2, this stage performs multi-resolution analysis 32 of the luminance signal in order to separate structural cues from texture/chromaticity on the one hand; and illumination on the other. The decomposition 32 is based on local operators so that the processing can be performed in a single pipeline. The result of the decomposition is a set of gray-scale images. A selection function 34 selects the components of the decomposition which will be used for depth reconstruction. The selected components are combined and output to the rendering block 40, while the other components can be discarded. When processing video streams, the component selection can be set once for the whole stream. The output of the selection block 34 is a single gray-scale image which contains the spatial structural information found in the original image. It will be used for depth calculation in the rendering pipeline.

The tone-mapping pipeline block 20 converts the HDR data stream to a conventional LDR data stream and also provides a buffering capability so that the image data can be stored while the depth calculation is performed. Methods for converting HDR to LDR image data are known in the art. Optionally, as shown by the dashed arrow, the 2D LDR image data can also be output directly so that conventional video-processing steps can also be applied to the data.

Figure 3:
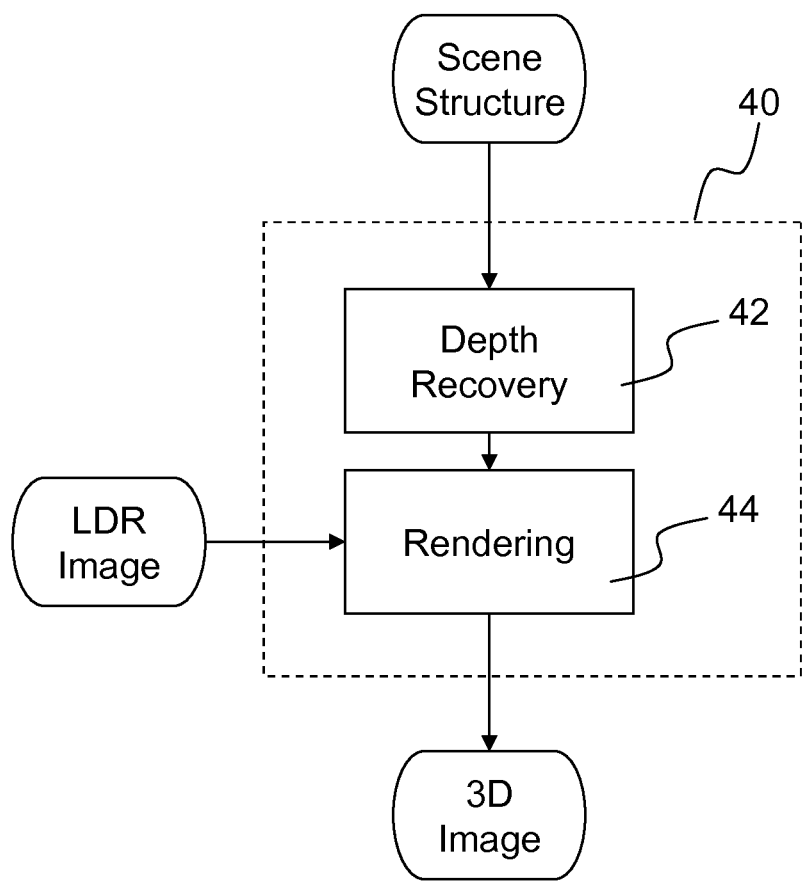
FIG. 3 is a block diagram of the rendering pipeline from FIG. 1.

The rendering pipeline 40, illustrated in FIG. 3, is the last stage of the process. The structural information extracted during signal decomposition is converted to a pixel-level depth-map by depth recovery block 42. This is passed to a rendering module 44, which produces a 3D image stream, by combining it with the LDR data stream. The 3D image data can be either depth-map enhanced 2D images, or a left-right stereo pair.

An exemplary method (for block 42) of recovering depth from a luminance image will now be described. Because luminance is related to the point of view of the observer, there is a direct relationship between the curvature of the illuminated surface and the perceived luminance. The intensity of the light will increase as the surface faces the sensor and decrease when it bends away. This approach is based on the same principles as traditional Shape from Shading (SFS) methods but, because HDR images capture a better estimate of the radiance of the scene, many of the additional assumptions needed in conventional SFS can be relaxed. These include the assumptions of Lambertian surfaces and point light at infinity. A direct relationship between the luminance of a pixel and its depth can then be established (subject to an unknown scale factor). This section will describe the way such a mapping from luminance to depth values can be built.

The luminance of each pixel expresses a quantity related to the intensity of the light that passes through or is emitted in the direction of the camera by the surface facing it. Luminance then follows the rendering equation:

$$L(x,y)=L_e+\int_\Omega f_r(\Theta_i,\Theta_o)L_i(\Theta_i)\cos\Theta_i d\omega_i \quad (2)$$

Where $L_e$ is the luminance emitted by the object (zero for non-emitting objects) and $f_r$ the reflectance function. The reflectance function describes the way the material of the object interacts with the incident light. $L_i$ is the intensity of the light reaching the objects in the scene, while $\cos\Theta_i$ is the incident angle of the light on the visible surface of the object. With a few weak assumptions, we can simplify the equations:

1. If the objects are not emitting light, or no direct light source is visible in the image, $L_e=0$
2. If the objects are diffuse, the reflectance map only depends on the angle between the incident light and the surface of the object (more specifically, the normal to the surface).
3. If the light source is unique and placed far enough from the scene, $\cos\Theta_i=cst\forall x, y$.

Under these hypotheses, the relationship between luminance and the curvature of the surfaces facing the cameras is straightforward and depth can directly be connected to luminance.

The exact relationship between luminance and depth has been studied in the shape-from-shading literature. Surface shape perception is linearly related to luminance, provided that:

1. The illumination and viewing direction are different
2. The surface is not self shadowing The second condition can be directly discarded by the use of an HDR sensor that will ensure correct exposure over the whole image. The first condition is generally satisfied in real (natural) scenes, especially outdoors. Based on these facts, the relationship between luminance and shape is then indeed linear and many different choices can be made for the transform function. A perceptually coherent transformation of the luminance that mimics human photoreceptor response is given by (n=0.73):

$$L_s(x, y) = \frac{L^n(x, y)}{L^n(x, y) + \sigma^n}; \sigma = \exp\left(\frac{1}{N}\sum_{x,y}\log(L(x, y))\right) \quad (3)$$

The depth can then directly be assimilated to the compressed luminance so that:

$$d(x,y)=L_s(x,y) \quad (4)$$

The method presented above makes it possible to build a direct mapping from pixels values to luminance and then from luminance to depth.

While this direct method already is able to rebuild the overall surface of the objects, some artefacts might still impair the results. Among these:

1. The whole surface can be shifted inside out. This artefact, known as the bas relief illusion is unavoidable when no additional reference information is available about the scene and its illumination. The bas relief illusion is due to the fact that the rendering equation (2) has many solutions when no additional constraints are used. The bas relief effect can have an effect on the whole image or only a part of it
2. Specular reflections are locally present in the scene and locally distort the depth map. This occurs when the Lambertian-surface assumption is broken locally—that is, when the reflectance map of the scene is not diffuse.
3. The global depth map is globally distorted when the illumination of the scene is not homogeneous. This kind of artefact is the main limitation for a general purpose utilisation of shape-from-shading or depth-from-luminance techniques.

The two last artifacts appear when the scene does not fit well into the hypothesis of shape-from-shading. According to an embodiment of the present invention an additional step is introduced prior to depth recovery, which decomposes the original luminance signal into texture/chromaticity/surface reflectance, structure (including shape), and illumination components.

The signal decomposition 32 which extracts the structural components from the signal is preferably unsupervised and easily implementable in hardware. The method of the present embodiment works in the image domain and does not require any additional knowledge about the scene. It separates the features of the image according to the spatial scale (that is, distance/size) over which intensity variations occur.

The decomposition algorithm takes advantage of the fact that illumination variations tend to appear as "slow" (large-scale) global variations of the luminance which are expected to spread over the whole image, underlying more local variations due to depth changes. The illumination field can therefore be considered as the statistically non-stationary component of the signal. On the other hand, texture and chromaticity changes are limited to localised regions of the image. These will usually appear in the first component of the decomposition, which corresponds to the smallest-scale luminance changes. The structural information lies in the intervening scales, between the largest and the smallest.

According to an embodiment of the invention, the depth map calculation 42 is based upon the decomposition 32 of the luminance signal: the structural components are selected and combined together 34. Optionally, the largest-scale component, corresponding to illumination, is used to adaptively further compensate for the distortion introduced by spatially varying illumination. The finest-scale component, representing texture, is discarded.

A detailed description of a particularly advantageous decomposition will be provided later, below.

When a HDR image is decomposed in this way, the first (smallest-scale) component clearly exhibits the highest frequencies in the signal and the residue (largest-scale component) contains the non stationary component (that is, the illumination field). The intermediate components can be used for depth reconstruction.

For real-time processing, for example in a video camera, it is desirable for the method to operate without any human supervision. In particular, the modes should be automatically selected and combined 34.

Several alternatives can be considered depending on the content of the scene:

Direct summation: this is the approach used in the present embodiment.

Mode selection: the structure of the scene may be extracted using an adaptive weighted sum of the modes.

Local mode selection: The weights in the sum may be locally adapted.

The result of the mode selection/combination 34 is then fed into the depth recovery process 42, optionally together with the illumination component for adaptive illumination correction.

In a straightforward implementation of the depth recovery algorithm (eq. 3), the log-sigmoid compression is applied uniformly to the whole image. However, it has been observed that in the human retina the compression level is adapted locally according to the light intensity of the surrounding retina cells. Based on this observation, the illumination component from the decomposition can be used to locally adapt the depth map to the illumination field, by directly feeding the illumination component R(x, y), once it has been renormalized to avoid numerical issues (like divide by zero or negative values), in equation 3:

$$L_s(x, y) = \frac{L^n(x, y)}{L^n(x, y) + R(x, y)^n} \quad (5)$$

This is an optional enhancement to the basic equation (3).

As described above, the method produces a depth map with values within the range [0, 1]. However, obtaining real depth values require rescaling the depth map, based on the knowledge of the real 3D position of one or more reference points in the scene. Using a camera with an auto focus lens provides such information: the focusing distance and the point of focus. Information about aperture, focal length and pixel sizes are also available so that the system is also aware about the depth of field for a given image. Using one or several initial control points and knowledge of the depth of field, the depth map can be rescaled so as to match the given focus-distance (and position) and the desired depth of field. Generally speaking, any additional knowledge about the 3D structure of the scene, such as data coming from motion stereo, focus, stereovision or even known control points in the scene can be used for such rescaling purposes.

Tests performed on a set of various real world images have shown that the method described above is very versatile and is able to perform perceptually accurate reconstruction in many cases. Thus, although the reconstruction may not be "perfect" the artefacts introduced by the processing tend to be of a type that are not visually disturbing for a human viewer—without additional knowledge, the human visual system would provide a similar interpretation. The method is particularly advantageous when used in conjunction with HDR image sensors. Further advantages include:

The method is straight forward: No calibration of tuning is required.

The signal decomposition (an example of which is described below) is unsupervised and finding the structural modes can be done in a systematic way.

The whole method can be streamlined and implemented on a microchip

No knowledge is required about the acquisition parameters (focus, exposure, etc.), but the rescaling of the depth map can take advantage of this information, if available.

Hardware implementing the method can be integrated into image acquisition devices (cameras) to produce directly 3D-enhanced videos or images.

Hardware implementing the method can be integrated as a part of video material post-processing—for example, in broadcasting studios.

Hardware implementing the method can be integrated into 3D displays to perform 2D to 3D conversion of existing video content.

The method does not require any specific acquisition hardware or acquisition protocol (and in particular, no camera calibration is necessary) providing that the dynamic range of the signal is large enough.

APPENDIX

Empricial Mode Decomposition

Background

For stationary signals which obey the principle of linear superposition, the Fourier Transform provides a very efficient tool for signal analysis. However, many physical systems and real world signals do not conform to this hypothesis. Wavelets are well suited for nonlinear data analysis, but they are limited by the choice of a basis (wavelet) function. To circumvent these limitations, the Empirical Mode Decomposition (EMD) has been proposed as a data-driven (that is, data-adaptive) approach for signal decomposition. EMD was originally proposed for the analysis of non-stationary (single-dimensional) time series by Huang et al. (N. E. Huang, Z. Shen, S. R. Long, M. C. Wu, H. H. Shih, Q. Zheng, N.-C. Yen, C. C. Tung, and H. H. Liu, "The empirical mode decomposition and the Hilbert spectrum for nonlinear and non-stationary time series analysis", Proceedings of the Royal Society of London, Series A: Mathematical, Physical and Engineering Sciences, 454(1971):903-995, March 1998. Since then, the method has also been extended for use with 2D and multivariate data.

The EMD algorithm attempts to build a set of orthogonal basis functions called "Intrinsic Mode Functions" (IMFs). Because IMFs are not constructed from any predefined basis function, but rather by adaptive filtering of the data, the EMD is well-suited for extracting components having a physical meaning and thus for the study of physical phenomena. Examples in the literature include rainfall analysis, electroencephalographs (EEG) and many others. The method can be used for various applications in image analysis, including illumination correction, image compression, and image fusion.

With EMD, however, the results are sensitive to the design of the decomposition algorithm. The IMFs that will be extracted are highly dependent on the implementation, which makes it difficult to compare and evaluate different algorithms. Moreover, multidimensional extensions of the EMD algorithm suffer from additional problems: firstly, IMF properties are difficult to extend to 2D or higher dimensions. Secondly, the main concepts for grounding the EMD algorithm have to be extended to multivariate data. Finally, the existing 2D EMD methods often suffer from excessive computational complexity when processing large datasets.

Proposed EMD in Two or More Dimensions

In the following, an iterative scheme to extract IMFs from multidimensional data will be described, according to an embodiment of an aspect of the invention. For the purposes of explanation, the example of 2D natural images will be described. However, the principles are also applicable to higher dimensions. The 2D example which will be described can be used with particular benefit in the method described earlier above, for separating a natural image into components related to texture, 3D (shape) structure and illumination.

It is helpful to first review the 1D EMD technique. This attempts to decompose a temporal signal $S_0(t)$ into a sum of n empirical modes ($c_i(t)$) and of a residue function ($r_n(t)$), which is either the mean trend of the signal or uniform (that is a constant value over the entire extent of the signal):

$$S_0(t) = \sum_{i=1}^{n} c_i(t) + r_n(t) \tag{A1}$$

The empirical modes can be extracted by a procedure called "sifting" which ensures that the modes are Intrinsic Mode Functions (IMF). For a 1D signal (that is, a temporal series) the IMFs satisfy the following properties:

1. The number of extrema and zero crossings must differ at most by one.
2. There is only one mode of oscillation (that is, only one maximum or minimum) between two consecutive zero crossings.
3. At any point, the local mean of the signal must be zero.
4. The IMFs are mutually orthogonal.

The main advantage of IMFs, compared with other basis functions such as sine and cosines (in the Fourier transform) or wavelets, is that IMFs are not restricted to narrow band signals but might be modulated in both frequency and amplitude. This property makes it possible to extract non-stationary modes from the signal and makes EMD a very efficient method to decompose a signal into physically relevant components.

The decomposition of the signal into IMFs starts with the extraction of local extrema (minima and maxima) over the whole signal. Local extrema are then interpolated, to build two envelopes: $E_{min}$ and $E_{max}$. The mean of these two envelopes is calculated and this is subtracted from the original signal to build the first component:

$$m_1(t) = \frac{1}{2}(E_{min}(t) + E_{max}(t)) \tag{A2}$$

$$h_1(t) = S(t) - m_1(t) \tag{A3}$$

This process ensures that the local mean of $h_1$ is zero; however, depending on the techniques used to build the envelopes, it might generate overshoots and undershoots and even create new extrema or change the existing ones. To avoid these problems, the sifting algorithm repeats the process several times, until the final component is indeed an IMF. At each iteration, the previous component is treated as the data so that:

$$h_1 = S_0 - m_1$$

$$h_{11} = h_1 - m_{11}$$

...

$$h_{1k} = h_{1k-1} - m_{1k}$$

Finally, once $h_{1k}$ is an IMF, it is set as the first component of the decomposition:

$$c_1 = h_{1k} \tag{A4}$$

For 1D signals, the sifting process stops once the standard deviation between two consecutive shifted components becomes low enough:

$$SD = \sum_{t=0}^{T} \left[ \frac{|(h_{1(k-1)}(t) - h_{1k}(t))|^2}{h_{1(k-1)}(t)^2} \right] \tag{A5}$$

The next IMF is extracted in the same way, by considering the remaining signal as the new data for the sifting process:

$$S_1 = S_0 - c_1$$

...

$$r_n = S_{n-1} - c_n$$

Finally, the decomposition stops once there are no longer any more extrema to extract from the remainder signal.

While EMD is well defined for single-dimensional signals, its extension to 2D (and higher dimensional) signals raises certain problems, including: finding local extrema in multiple dimensions; building the envelopes; defining a stopping criterion for the sifting process; and defining the properties of IMFs in multiple dimensions. The solution adopted for each problem will influence the final result and, because of the lack of theoretical grounding in the literature, it is very difficult to asses the performances of a specific implementation. In the following, the issues listed above will be addressed, while describing a 2D EMD according to an embodiment of the invention.

The definition of local extrema in 1D is straightforward, but the 2D extension of this is more ambiguous. In the present embodiment, a local extremum in the discrete 2D image domain is defined as follow: let $X \in \mathbb{Z}^2$ be the set of discrete 2D points in the image domain, $I(x): \mathbb{Z}^2 \to \mathbb{R}$ the intensity function which gives image intensity for the pixel x, and $N_d(x)$, $x \in X$ the neighbourhood of size d around the pixel. A point $x^* \in X$ is defined as a local maximum (respectively minimum), if and only if: $\forall x \neq x^* \in N_d(x^*)$ we have $I(x^*) > I(x)$ (respectively $I(x^*) < I(x)$). This means that the centre point of the neighbourhood must be greater than (or less than, respectively) all other points in the neighbourhood to be detected as an extremum, which excludes a plateau having multiple pixels of the same value. Fine tuning of the extrema detection can be achieved by changing the neighbourhood size d or its shape. In the present embodiment, a restrictive definition is adopted, by defining $N_3$ as the 3×3 window surrounding each pixel. This avoids introducing any bias related to the scale of the significant features to be considered at a specific level of the decomposition—an extreme pixel need only have a value greater/lesser than its immediate 8-neighbours.

Once both local minima and maxima have been detected, the related envelopes must be generated. A common choice in the literature is to use thin plate spline interpolants. However, this requires inverting a linear system of size n×n (where n is the number of extrema), which leads to an excessive computational burden when applied to large images.

For the present embodiment, it is considered that a good method for building envelopes should obey the following principles:

1. The method should produce smooth surface.
2. The method should avoid using basis functions which could introduce artificial properties into the decomposition.
3. The surfaces should follow the data, in the sense that local extrema of the data should be the only local extrema of the surface.

4. Boundary conditions (for example, at the image-border) should be handled without any data extrapolation and without using boundary conditions that would assume a periodic behaviour of the data.

5. Computational complexity should increase modestly with the number of control points (maxima/minima).

The previously proposed interpolation methods cannot fulfil all of these requirements simultaneously. Interpolation involves projecting the data over a predefined set of basis functions, the problem being how to find the parameters of this projection. Another way to achieve this goal is to use convolution filters. Applying a convolution mask is equivalent to locally projecting the data onto a basis defined by the filter's impulse response. Such filters can be implemented efficiently and, if we use a low pass filter, it should lead to smooth surfaces whose local extrema are those already present in the input data. Filtering, however, comes at the expense of a loss of energy in the signal, because some frequencies are discarded. The direct effect of this is that the filtering operation will not preserve the local extrema: although their location is preserved, their intensity (amplitude) is changed. Moreover, when building the envelopes the method must rely only on local maxima (respectively minima) and thus the filtering algorithm must be adapted to sparse data. One way to deal with sparse data is to filter considering only the data available and to compensate afterward for the missing ones. This is the aim of normalised convolution, introduced by Knutsson et al. (H. Knutsson and C-F. Westin, "Normalized and differential convolution: Methods for interpolation and filtering of incomplete and uncertain data", Computer Vision and Pattern Recognition (CVPR), pages 515-523, June 1993.

Normalised convolution (NC) has been proposed as a tool to perform convolution operations on data with missing or uncertain samples. The normalised convolution framework works by attaching simultaneously a certainty map $c(x, y)$ to the data S and an applicability function $a(x, y)$ to the filter basis function B. The certainty map is a map, the same size as the input image, whose value between zero and one indicates how much the value of the corresponding pixel in the input image can be "trusted". In the present embodiment, it is binary and contains one where there are control points and zeros everywhere else. The applicability function will practically correspond to the impulse response of the filter in the basis function defined by B. The approach can be viewed as the solution of a weighted least square (WLS) problem, were the weights are defined by both signal certainties, $c(x, y)$, and filter applicability $a(x, y)$. NC provides a solution to the WLS system that can be calculated efficiently using a set of fixed convolution operators.

In general, B is a matrix of basis functions used to build a local representation of the signal s. Each function occupies a column of the matrix, so that:

$$s' = Bu \qquad (A6)$$

The basis B being given, the optimal weights which minimise $\|s'-s\|$ are found by minimising:

$$\tilde{u} = \arg\min_u \|W_a W_c (B_u - s)\| \qquad (A7)$$

where, $W_a$ and $W_c$ are diag(a) and diag(c) respectively. By writing $W = W_a W_c$ the solution of the WLS problem is given by:

$$\tilde{u} = (B^* W B)^{-1} B W^2 s \qquad (A8)$$

where B* is the complex conjugate of B. Finally, the filtered data is obtained by projecting back into the original space:

$$\tilde{s}' = B\tilde{u} \qquad (A9)$$

The most common choice for basis decomposition in normalised convolution is a polynomial basis, $B=\{1, x, y, x^2, y^2, xy, \ldots\}$, where $1=[1, \ldots 1]^T$, $x=[x_1, \ldots x_N]^T$, $x^2=[x_1^2, \ldots x_N^2]^T$, are vectors of length N constructed upon the local coordinates of the samples. The order of the basis is then chosen according to the order of the features which have to be reconstructed.

When building the envelopes for the EMD, we want the output of the filter to only follow the information provided by the control points (requirement 3). There is then no need for a high-order basis; instead the basis can be restricted to a single basis vector—the column of ones, B=1 (requirement 2). The filtering can then be implemented as a pair of regular convolutions:

$$\tilde{S}' = \frac{a * S}{a * c} \qquad (A10)$$

These convolution operations can be implemented efficiently and their complexity is not related to the image content—in particular, the number of extrema (requirement 5). However, this method does not work well when the data is too sparse for a sufficient number of points to fit inside the filter mask. This problem is addressed by adapting the concept of normalised convolution for the specific purpose of envelope estimation.

The normalised convolution method described so far already satisfies 3 out of 5 of the desired objectives listed previously. In order to address the remaining limitations the present inventors have devised an alternative definition of the applicability function, as well as an efficient algorithm to perform the calculation.

For the filter to produce smooth surfaces, one must ensure that the filter would act as a low pass filter. Applicability functions are often isotropic functions whose value decreases with the distance from the origin (centre). A suitable choice for the applicability function as a low pass filter is a Gaussian Radial Basis Function (RBF):

$$G(r) = e^{-\frac{r^2}{2\sigma^2}} \qquad (A11)$$

were r stands for the Euclidean distance from point $(x, y)$ to the origin ($r=\sqrt{x^2+y^2}$). In practice, the applicability function should originate in the centre of its application domain so a matrix a of size v×w is built:

$$a(x, y) = e^{-\frac{\sqrt{(((v-1)/2)-x)^2 + (((w-1)/2)-y)^2}^2}{2\sigma^2}} \qquad (A12)$$

This applicability function can be further tuned by choosing a suitable domain size and cut-off frequency ($\sigma$). The size of the domain on which the applicability function has to be defined will have a direct influence firstly on the smoothness of the surface (requirement 1): when few control points (extrema) are available, a limited domain would lead to sharp changes in the calculated value when a new control point is taken into account, as the filter mask is shifted across the image (and when an old point falls out of the filter mask). Secondly, the domain size influences the behaviour of the filter when close to the border of the image (requirement 4): the envelope estimate at the signal domain boundaries would suffer from inaccuracies when a large portion of the filter mask falls outside of the image and few control points (or none) are available.

To overcome these problems in the current method, all control points are taken into account when performing the calculation for any point in the signal domain, but signal extrapolation outside the signal boundaries shall be avoided. The applicability function domain is therefore defined so that the function completely covers the image when centred on any of its pixels. This leads to a domain that is double the data size in each of its dimensions. Straightforward implementation using traditional linear convolution (eq. A10) then becomes practically challenging. An alternative algorithm that only calculates the contribution of control points is therefore proposed. This algorithm exploits the commutative property of the convolution operator and treats the filtering operation as the convolution of the (large) applicability function, with the (smaller) signal.

Linear discrete convolution of a 2D signal S with a filter impulse response F defined over a window of size v×w can be written as a double summation over the window's dimensions:

$$(S*F)(x, y) = \sum_{i=-a}^{i=a} \sum_{j=-b}^{j=b} F(i, j) S(x+i, y+j) \quad (A13)$$

where $a=(v-1)/2$ and $b=(w-1)/2$. However, when building the envelopes, the corresponding filter size is the definition domain of the applicability function, a. Thus, v=2 m and w=2 n, where m,n are the number of lines and columns of the image, respectively. On the other hand, the data only contains nonzero values where the local extrema (maxima or minima) have been found, such that many terms of the summation will be zero. Moreover, because the filter mask is bigger than the image, most of it will fall outside of the image domain and the limits of the summation can be adjusted accordingly. These considerations allow us to rewrite the convolution of the signal with the applicability function as:

$$(S*a)(x, y) = \sum_{x_i, y_i, i \in 1 \ldots k} S(x_i, y_i) a((m-x)+x_i, (n-y)+y_i) \quad (A14)$$

are $x_i$, $y_i$, $i \in 1 \ldots k$ the coordinates of the control points. In a similar way, because the certainty map only contains ones where the local extrema have been detected and zeros elsewhere, the convolution of the applicability function with the certainty map can be written as:

$$(c*a)(x, y) = \sum_{x_i, y_i, i \in 1 \ldots k} a((m-x)+x_i, (n-y)+y_i) \quad (A15)$$

Finally, the local extrema envelope is calculated by renormalizing (A14) with (A15) according to (A10):

$$E(x, y) = \frac{(S*a)(x, y)}{(c*a)(x, y)} \quad (A16)$$

$$= \frac{\sum_{x_i, y_i, i \in 1 \ldots k} S(x_i, y_i) a((m-x)+x_i, (n-y)+y_i)}{\sum_{x_i, y_i, i \in 1 \ldots k} a((m-x)+x_i, (n-y)+y_i)}$$

This formulation allows the calculation of the envelope with a computational cost which increases linearly with the number of control points (extrema)—the complete envelope being estimated in O(nmk) operations, where n,m are the dimensions of the image and k is the number of control points (requirement 5). The envelope produced is based on a general low pass filtering of the control points which guaranties both its smoothness (requirement 1) and faithful following of the data (requirement 3). Finally, the method also avoids using a predefined basis projection (requirement 2) and limits artefacts on the boundaries of he image domain (requirement 4).

The behaviour of the envelope estimation method with respect to the sifting process will now be considered. It has been found that different choices of filter bandwidth will lead to very different results. These range from results similar to nearest neighbour interpolation, if σ is small, to planar interpolation for large values of σ, with intermediate values of σ leading to smooth surface. The choice of an appropriate value for σ is thus important for ensuring that the decomposition exhibits the desired properties. It is also necessary to consider the way in which the sifting process will handle successive iterations of the method and to choose a suitable test to stop it when the desired result is achieved.

The choice of filter size is difficult because there is no objective quantitative test to assess the results of the decomposition. A qualitative evaluation will therefore be adopted. Intuitively, it appears that it is desirable for the filter to give a significant importance to a sufficient number of points when they are dense enough. The filter must also be selective enough to allow the envelope to closely follow the variation suggested by the control points. These requirements can be met if the filter bandwidth is chosen according to the distance between natural neighbours among the control points. Natural neighbours are defined as those vertices which are connected, when the Delaunay triangulation of the extrema in the Cartesian plane is calculated. Experiments have shown that the average distance between natural neighbours is a good choice for the filter bandwidth, σ. The filter bandwidth parameter can be determined in at least two alternative ways. In some embodiments, the set of maxima and the set of minima can be considered separately. That is, the filter bandwidth for generating the maximum envelope is chosen based only on the set of local maxima, while the bandwidth for the minimum envelope is determined only by the set of local minima. In other embodiments, the average distance between neighbouring extrema is calculated based upon both the natural neighbours in the set of maxima and the natural neighbours in the set of minima. This produces a single, common bandwidth value, which ensures that both envelopes will be based on the same filter. The calculation is given by:

$$\sigma = \text{mean}(\|t_{ij}\|) \quad (A17)$$

$$t_{ij} = (x_i, y_i)^T - (x_j, y_j)^T \quad (A18)$$

where i and j are the indices of connected nodes in the triangulation. This choice for σ has been found to lead to stable results and a reduced number of IMFs, on a wide range of real and synthetic images while producing IMFs that can be attributed consistently to physical phenomena.

In the 2D domain, it appears that it is impossible to build IMFs that satisfy all of the properties listed previously, above, for a 1D IMF. In particular, for 2D signals, it may be difficult to build IMFs that obey the rules governing the number of modes and extrema defined for 1D signals. This difficulty should be taken into account when designing the stopping criterion for the shifting process in two or more dimensions. For the present 2D case, the two requirements are relaxed, using a reformulation of the standard deviation parameter:

$$D = \frac{\sum_{x=1}^{M}\sum_{y=1}^{N}[|(h_{1(k-1)}(x, y) - h_{1k}(x, y))|^2]}{\sum_{x=1}^{M}\sum_{y=1}^{N}\|h_{1k}(x, y)\|^2} \quad (A19)$$

It is believed that this formulation is less sensitive to local fluctuations of the denominator than a direct extension of equation A5. It is also believed that the modes extracted using this criterion tend to satisfy (at least approximately) the desired orthogonality property.

In the presently described embodiment, the sifting process is used mainly to compensate for the loss of energy introduced by the low pass filtering, by iterative processing of the residual (eq. A4). The sifting is stopped when further processing does not bring any significant change in the local mean estimate. More specifically, the iterations continue only as long as D>0.1, with D calculated as described by (A19).

The 2D EMD method described above has been found to produce good results on a variety of different types of image. Of course, other decompositions may be used, or the parameters of the present decomposition adjusted to suit particular applications. Preferably, the method used is based on an EMD algorithm. EMD algorithms can be characterised as those which produce a decomposition in to IMFs. For the purposes of 2D decomposition, we define 2D IMFs as follows. An image is an IMF if:

1. It has a zero mean;
2. Its local maxima in IMFs are positive while local minima are negative; and
3. It has the same number of positive local maxima as negative local minima.

A hardware architecture for implementing an EMD method as described above will now be explained with reference to FIGS. 4-7. This architecture can be used to implement the multi-scale decomposition block 32 in FIG. 2.

Figure 4:
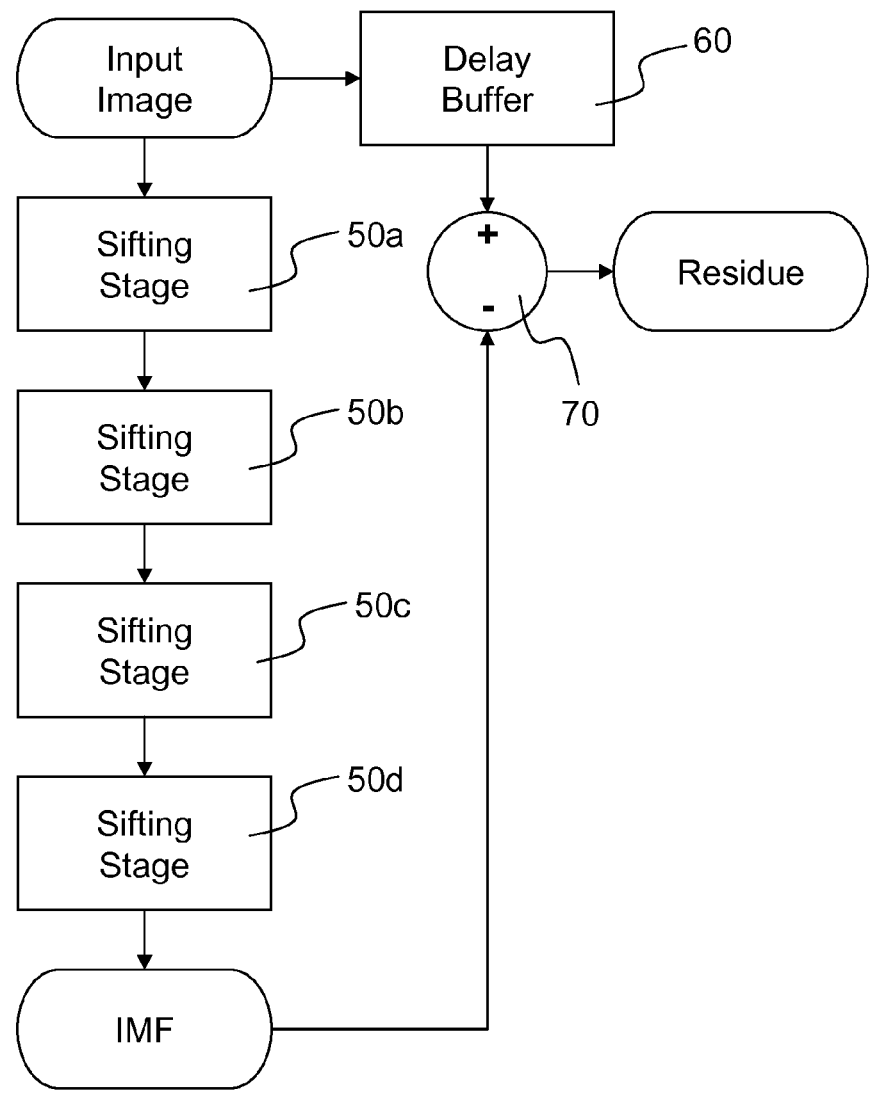
FIG. 4 is a block diagram showing an exemplary hardware pipeline for implementing one stage of an Empirical Mode Decomposition according to an embodiment of the invention.

FIG. 4 shows one stage of the decomposition. The input is an intensity image and the outputs are an IMF and a residue image. According to one embodiment, six of the stages shown in FIG. 4 are concatenated to perform the full decomposition. The residue of the preceding stage forms the input image to the next stage. In the description of the EMD method, earlier above, it was noted that IMFs should be extracted iteratively until convergence (that is, until no more local maxima or minima can be detected in the residue). However, for practical purposes—in particular, for most natural images—the inventors have found that it is sufficient to extract a fixed number of IMFs. The maximum number of IMFs is dependent on some image properties. In this exemplary embodiment, the original input image is separated into at most seven components: at most 6 IMFs and a final residue signal. The first IMF can be attributed to image noise, texture, and other local variations in the reflectances of objects in the scene. The final residue can be attributed to illumination. The other IMFs are attributed to 3D structure, including shape. For most typical images, in practice, between two and four IMFs will be obtained.

At each stage of the EMD, the input image is supplied to a chain of sifting stages 50a-d. These will be described in more detail with reference to FIG. 5. The four sifting blocks 50a-d facilitate a pipelined implementation, suitable for decomposing a video consisting of a stream of frames—each stage can process one frame while the preceding stage in the pipeline processes the next frame. The design of pipelined implementations, in general, will be familiar to those skilled in the art of real-time video processing.

In the previous description, above, of the EMD method, it was indicated that the sifting continues until convergence—that is, until the outputs from consecutive iterations are similar. In practice, the inventors have found that a fixed number of iterations is acceptable for most natural images. In this embodiment, the sifting is carried out four times, by the serially connected sifting stages 50a-d.

While the sifting is carried out in the pipeline 50a-d, the input image is delayed in a (pipelined) delay buffer 60. The IMF extracted by the sifting process 50a-d is then subtracted from the corresponding input image, using subtraction block 70. The result of this subtraction operation is the residue.

Figure 5:
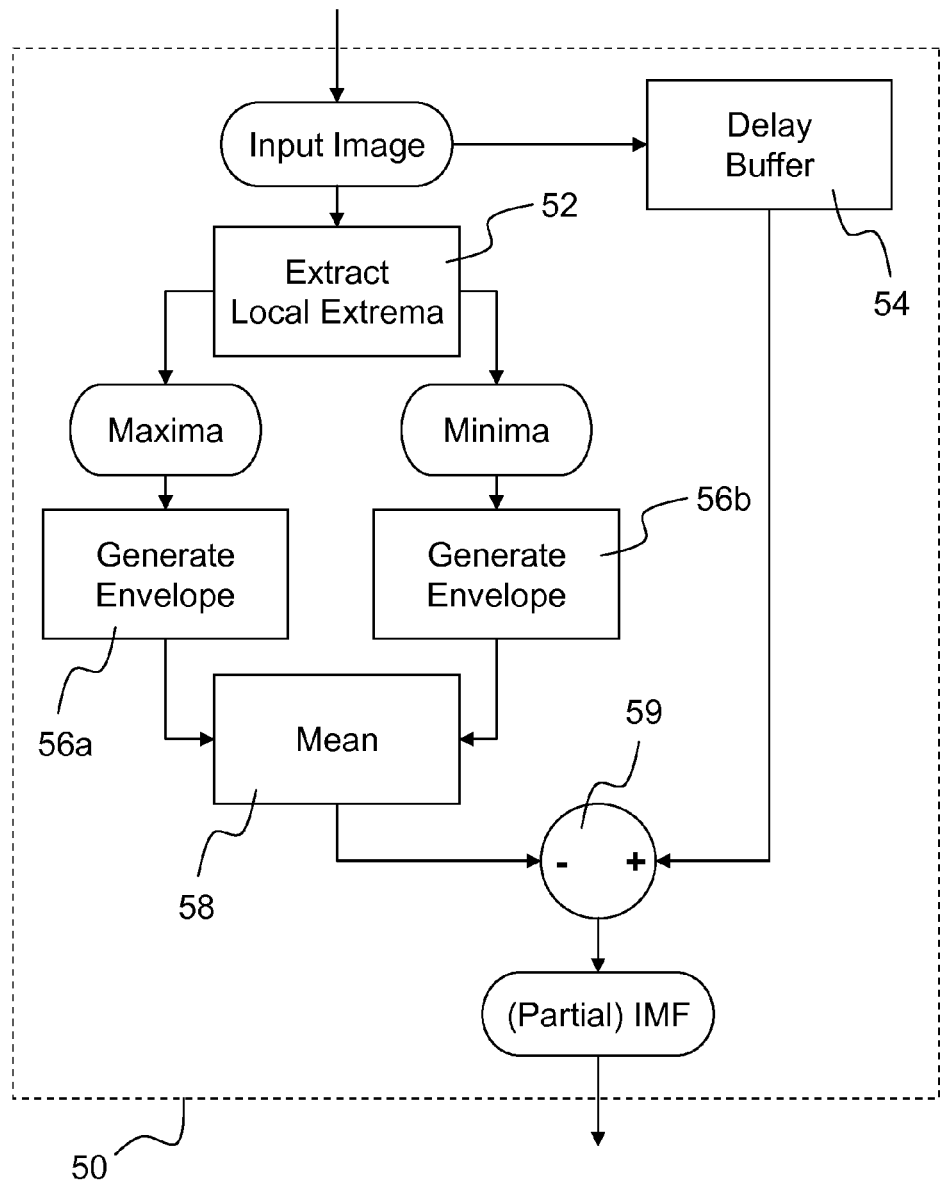
FIG. 5 is a block diagram illustrating the design of each sifting stage in FIG. 4.

As shown in FIG. 5, each sifting stage 50 comprises subtracting a local mean image from the input image. The input to the sifting block 50 is supplied to a local extrema extraction unit 52 and to a delay buffer 54. The delay buffer 54 stores the image while the local mean is being calculated, so that the local mean is subtracted from the correctly corresponding input image, in a pipelined implementation.

Local extrema are extracted 52 as described previously above. This results in two sets of points—a set of local maxima and a set of local minima. Envelope generation units 56a and 56b are provided for constructing the envelope functions from the respective sets of extrema. The interpolation operation performed by the envelope generation unit will be described with reference to FIG. 6. The mean of the two envelopes is calculated by block 58. This is then subtracted, in subtraction block 59, from the input image that was delayed by the buffer memory 54. The result is a partial IMF, which is passed to the next sifting stage 50. The output of the final sifting stage 50d is taken as an IMF.

Figure 6:
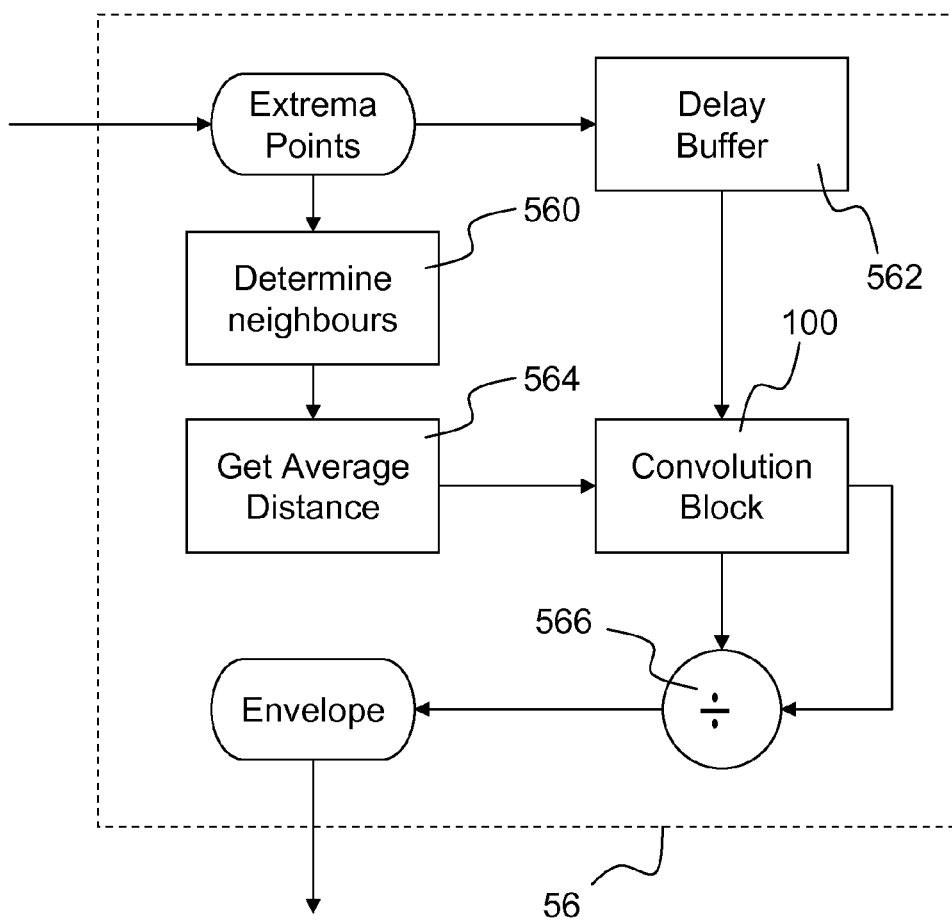
FIG. 6 illustrates the envelope generation block of FIG. 5 in greater detail.

FIG. 6 illustrates the envelope generation unit 56 in greater detail. The input is a set of extrema points (maxima or minima). These can be represented as a set of triples (x, y, S(x, y)), where x and y are the image coordinates of the extemum and S(x, y) is the value of the extremum. This "point cloud" is input to both a neighbourhood determination process 560 and a delay buffer 562.

The neighbourhood determination 560 calculates the Delaunay triangulation of the point set, in order to identify the nearest neighbours within the set. Based on the identified neighbours, block 564 calculates the mean distance between these neighbours. The mean distance is input to the convolution block 100, for use as the bandwidth parameter. The delay buffer 562 supplies the point cloud to the convolution block 100. The point cloud is suitably delayed by the buffer 562, so that it arrives in the convolution block synchronously with the average distance value for that point cloud. The convolution block produces two images: an array of numerator values and an array of denominator values. The division operator 566 divides the former by the latter, to produce the result of the normalised convolution. This is the envelope function, which is output from the envelope generation unit 56.

Figure 7:
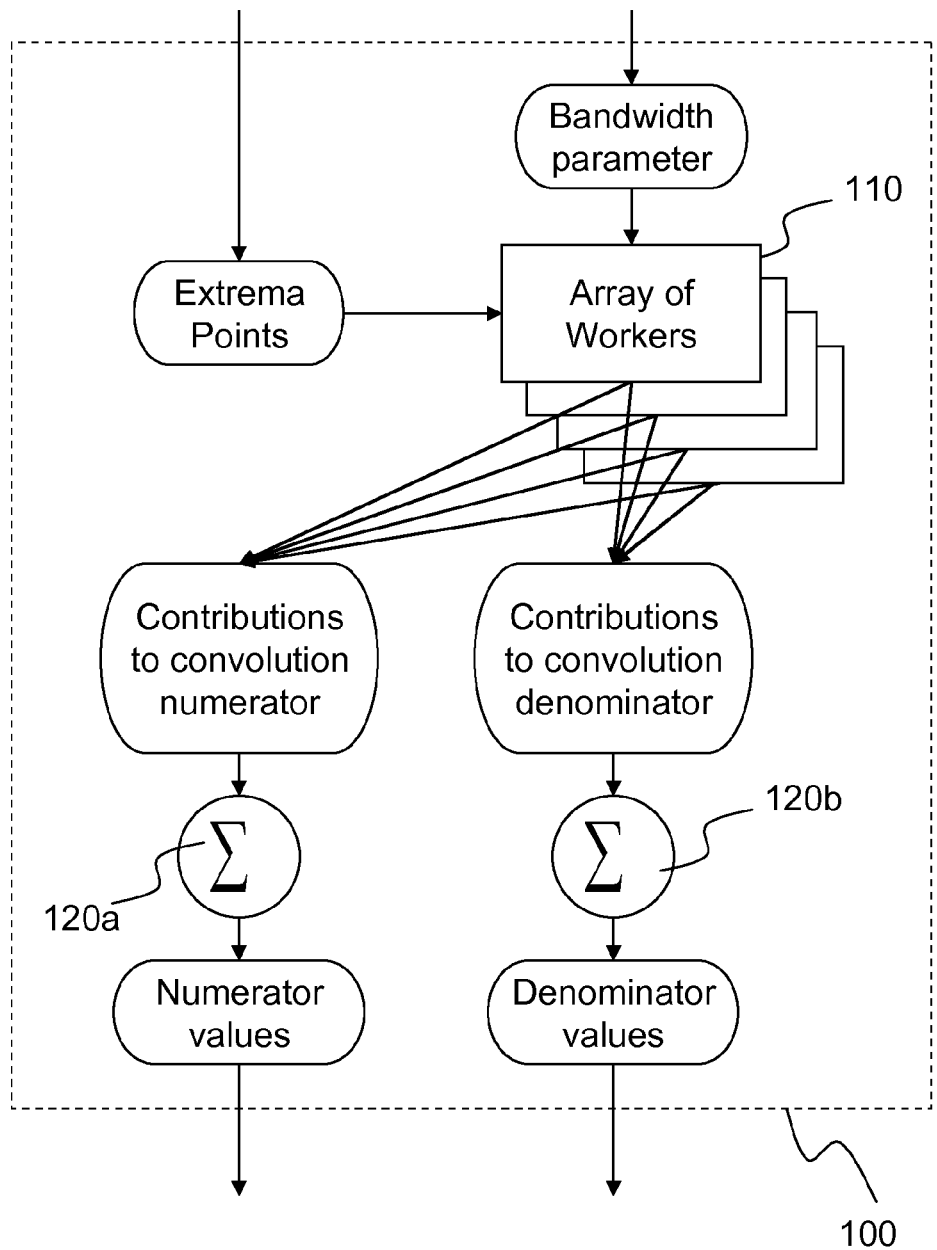
FIG. 7 illustrates the convolution block of FIG. 6 in greater detail.

FIG. 7 shows the convolution block 100 in greater detail. The inputs are the set of extrema (maxima or minima) and the bandwidth parameter (the mean distance between neighbouring extrema). These are input to an array of worker units 110. Each worker unit performs the calculations pertaining to one of the local extrema. That is, it calculates the contribution of its assigned extremum to all pixels of the image. This contribution consists of two parts: a contribution to the numerator of equation (A16) and a contribution to the denominator. Using the notation of (A16), a variable number of k workers would therefore be required for a fully parallel implementation. In practice, some smaller, fixed number of worker units will be available in a given hardware implementation. The workers can be set to work on local extrema as the data arrives (in a pipelined stream). Once all the available workers are working, the subsequently arriving extrema are buffered until workers become available again. This facilitates pipelined processing not only between successive images in a video stream, but also among pixels of a given image. The pixels are processed by the workers partly in parallel and partly in series. Note that the extraction of extrema from an image may preferably be implemented as a serial operation, because relationships between pixels need to be considered. Therefore, it is convenient to generate the extrema in a serial stream. This matches well with a serial-parallel processing regime in the convolution block 100—in particular, the worker array 110.

The numerator contribution is the product of the value of the local extremum and the value of the Gaussian RBF. The denominator contribution is the value of the Gaussian RBF. The contributions are summed in summation units 120a and 120b and output to the division operator 566 shown in FIG. 6.

Note that the Gaussian function will have a very small value for pixel locations far from the local extremum (because the tail of the Gaussian drops exponentially towards zero). To reduce the computational burden, negligible values can be quantised to zero. This will reduce the number of multiplications to be carried out (since the product of any number with zero is zero) and also the number of values to be included in the summations 120a and 120b.

The architecture illustrated in FIGS. 4-7 provides an efficient means to implement the EMD according to an embodiment of the invention. This is particularly well suited to image and video processing, because of its pipelined design.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Similarly, a signal representing 3D image data may be stored/distributed on a suitable storage medium, preferably a non-volatile machine-readable medium. Suitable storage media include but are not limited to: optical media, such as a Blu-ray Disc (BD) or DVD; magnetic media, such as a hard disk drive; and solid-state media, such as a flash memory. Any reference signs in the claims should not be construed as limiting the scope.

The invention claimed is:

1. A method of decomposing an image or video into a plurality of components, the method comprising:
obtaining (10) an intensity signal of the image or video; and
decomposing (30) the intensity signal into a component representing the three-dimensional structure of one or more objects in the scene and at least one other component, wherein basis functions of the decomposition (30) are determined adaptively from the intensity signal, and wherein the decomposition comprises a two-dimensional Empirical Mode Decomposition, EMD, comprising:
determining (58) a local average of the intensity signal at each point in the image,
wherein the local average at each point in the image is defined as the mean of two envelope functions at that point:
a maximum envelope, comprising a function which interpolates among local maxima of the intensity signal; and
a minimum envelope, comprising a function which interpolates among local minima of the intensity signal,
the method further comprising generating (56a) the maximum envelope by:
extracting (52) from the intensity signal a sparse maximum intensity signal which comprises the value of the intensity signal at local maxima; and
performing normalized convolution (100) of the sparse maximum intensity signal with a smoothing filter; and
generating (56b) the minimum envelope by:
extracting (52) from the intensity signal a sparse minimum intensity signal which comprises the value of the intensity signal at local minima; and
performing normalized convolution (100) of the sparse minimum intensity signal with a smoothing filter;
wherein the intensity signal is decomposed according to the spatial scale of variations in the intensity, and
the other component comprises at least one of:
a component representing surface reflectance of the objects;
a component representing noise in the image; and
a component representing illumination in the scene,
the noise and reflectance components comprising variations at a small scale, the structure component comprising variations at a medium scale, and the illumination component comprising variations at a large scale or a uniform value.

2. The method of claim 1 wherein the decomposition (30) comprises non-linearly filtering the intensity signal.

3. The method of claim 1, further comprising generating (42) a depth map from the structure component.

4. The method of claim 3, wherein:
the at least one other component resulting from the decomposition comprises an illumination component; and
the generated depth map is dependent upon the illumination component.

5. The method of claim 3, further comprising using the generated depth map to synthesise (44) image data suitable for 3D display.

6. The method of claim 1, wherein the image is a high dynamic range image.

7. A method of performing an Empirical Mode Decomposition on image or video data in two or more dimensions, the image or video data comprising an array of elements each having at least one value, the method comprising:
determining (58) a local spatial average value for each element, wherein the local average at each element is defined as the mean (58) of two envelope functions at that element:
a maximum envelope, comprising a function which interpolates among local maxima of the element values; and
a minimum envelope, comprising a function which interpolates among local minima of the element values,
the method further comprising generating (56a) the maximum envelope by:
extracting (52) from the element values a sparse maximum signal which comprises the value of the element at each local maximum; and
performing normalized convolution (100) of the sparse maximum signal with a smoothing filter; and
generating (56b) the minimum envelope by:
extracting (52) from the element values a sparse minimum signal which comprises the value of the element at each at local minimum; and
performing normalized convolution (100) of the sparse minimum signal with a smoothing filter.

8. The method of claim 1, wherein the normalised convolution is calculated by combining (566) the results of two convolution operations.

9. The method of claim 1 wherein a spatial scale parameter of the smoothing filter is chosen dependent upon a representative distance between neighbouring points in the set of maxima, or in the set of minima, or in the union of both sets.

10. The method of claim 1, wherein:
a local maximum is defined as a pixel whose value is greater than the values of the other 8 pixels surrounding it, in a 3×3 square neighbourhood centred on the pixel; and
a local minimum is defined as a pixel whose value is less than the values of those other 8 pixels.

11. Signal processing apparatus adapted to perform an Empirical Mode Decomposition on numerical data, the data comprising an array of elements in two or more dimensions, each element comprising a value, the apparatus comprising:
an averaging unit (58), adapted to determine for each element in the array a local average value,
wherein the local average at each element is defined as the mean of two envelope functions at that element:
a maximum envelope, comprising a function which interpolates among local maxima of the element values; and
a minimum envelope, comprising a function which interpolates among local minima of the element values,
the averaging unit further comprising:
a local extrema extraction unit (52), adapted to extract from the element values a sparse maximum signal which comprises the element-value at each local maximum and a sparse minimum signal which comprises the element-value at each at local minimum;
a maximum envelope generation unit (56a), adapted to generate the maximum envelope by performing normalized convolution of the sparse maximum signal with a smoothing filter; and
a minimum envelope generation unit (56b), adapted generate the minimum envelope by performing normalized convolution of the sparse minimum signal with a smoothing filter.

12. The apparatus of claim 11, wherein each envelope generation unit comprises:
a plurality of worker units (110), each unit adapted to calculate the contribution of one local extremum to the normalized convolution for a plurality of elements in the array; and
an adder (120a, 120b), for summing the contributions of the workers for each element of the plurality.

\* \* \* \* \*